United States Patent [19]

Moser et al.

[11] Patent Number: 5,597,886
[45] Date of Patent: Jan. 28, 1997

[54] HEAT-CURABLE EPOXY RESIN SYSTEMS HAVING A GOOD REACTIVITY/STABILITY RATIO

[75] Inventors: Roland Moser, Basel; Daniel Bär, Riehen, both of Switzerland

[73] Assignee: Ciba-Geigy Corporation, Tarrytown, N.Y.

[21] Appl. No.: 512,044

[22] Filed: Aug. 7, 1995

Related U.S. Application Data

[63] Continuation-in-part of Ser. No. 399,687, Mar. 7, 1995, abandoned.

[30] Foreign Application Priority Data

Mar. 10, 1994 [CH] Switzerland ................... 720/94-3

[51] Int. Cl.[6] .................... C08G 59/68; C08G 59/72; C08G 59/42
[52] U.S. Cl. .................... 528/91; 528/365; 525/506
[58] Field of Search ................ 528/91, 365; 525/506

[56] References Cited

U.S. PATENT DOCUMENTS

| | | | |
|---|---|---|---|
| 2,890,195 | 6/1959 | Phillips et al. | 260/45.4 |
| 3,784,647 | 1/1974 | Fleming et al. | 528/91 |
| 3,793,247 | 2/1974 | Fleming et al. | 528/91 |
| 4,663,072 | 5/1987 | Cheung | 252/182 |

FOREIGN PATENT DOCUMENTS

| | | |
|---|---|---|
| 0254255 | 1/1988 | European Pat. Off. . |
| 033456A | 9/1989 | European Pat. Off. . |
| 2102183 | 8/1971 | France . |
| 1520206 | 10/1969 | Germany . |
| 8703592 | 6/1987 | WIPO . |

OTHER PUBLICATIONS

Derwent Abstracts 89–109370/15, "Epoxy Resin Composition for Casting and Sealing".

Lee and Neville, "Handbook of Epoxy Resins", McGraw Hill Inc. (1967), pp. 9–3.

Vol. 13, No. 249 (C–605) 9, Abstract of JP–A–01 054 022, Jun. 1989.

Derwent Abstract, 89–109370/15 (JP-A-Sho 01/054022 (1987).

*Primary Examiner*—Frederick Krass
*Attorney, Agent, or Firm*—William A. Teoli, Jr.; David R. Crichton

[57] ABSTRACT

Heat-curable epoxy resin systems comprising
(a) at least one epoxy resin,
(b) at least one polycarboxylic acid anhydride, and
(c) 1,4-diazabicyclo(2,2,2)octane or a $C_1$–$C_4$alkyl-substituted derivative of 1,4-diazabicyclo(2,2,2)octane as curing accelerator, and wherein one portion of the curing accelerator (c) is replaced by
(d) a complex of a boron halide with an amine, have good reactivity at elevated temperatures and comparatively high stability at temperatures below c. 80° C.

5 Claims, No Drawings

HEAT-CURABLE EPOXY RESIN SYSTEMS HAVING A GOOD REACTIVITY/STABILITY RATIO

This is a continuation-in-part of application Ser. No. 08/399,687 filed Mar. 7, 1995 abandoned.

The present invention relates to novel heat-curable epoxy resin systems comprising (a) at least one epoxy resin, (b) at least one polycarboxylic acid anhydride, and (c) 1,4-diazabicyclo-(2,2,2)-octane or a $C_1$–$C_4$alkyl-substituted derivative of 1,4-diazabicyclo(2,2,2)octane as curing accelerator, to specific compositions which are novel components of such multicomponent systems, to the use of said systems as casting compositions, and to a preferred process for the fabrication of moulded objects using such systems.

Epoxy resin systems or compositions of the above-mentioned kind are disclosed, inter alia, in Japanese published patent specification JP-A-Sho 01-054022 (1989). The curing accelerator 1,4-diazabicyclo(2,2,2)octane (abbreviated to DABCO or also known as triethylenediamine) effects a rapid cure of the compositions at elevated temperature, e.g. from 120° C., so that short demoulding times can be achieved. However, epoxy resin compositions containing 1,4-diazabicyclo(2,2,2)octane as curing accelerator are also highly reactive even at moderately elevated temperatures and therefore have only a relatively poor shelf stability and, especially in the temperature range from 60° to 80° C. which frequently has to be applied during the handling and/or processing of the compositions prior to the cure, have only unsatisfactory stability and a short pot life. Another tertiary amine mentioned as accelerator in JP-A-Sho 01-054022 is benzyl dimethylamine. Benzyl dimethylamine, which is often used as curing accelerator in corresponding commercial products, has the same shortcomings as DABCO, and indeed even to a more pronounced degree.

In contrast, epoxy resin systems comprising an anhydride hardener and a complex of a boron halide and a tertiary amine as curing accelerator are substantially more stable at moderately elevated temperatures. Such compositions are disclosed, inter alia, in U.S. Pat. No. 3,793,247, but have the converse drawback that they exhibit a relatively poor reactivity at elevated temperature and hence give rise to demoulding times that are often currently no longer economically acceptable.

It is therefore the object of this invention to provide an accelerator for the thermal cure of epoxy resins with polycarboxylic acid anhydrides, which accelerator has a more balanced ratio of reactivity at elevated temperature to stability (to a premature onset of cure) at moderately elevated temperature than conventional curing accelerators.

This object is achieved in the practice of this invention by using as curing accelerator a mixture of 1,4-diazabicyclo-(2,2,2)-octane or a $C_1$–$C_4$alkyl-substituted derivative of 1,4-diazabicyclo-(2,2,2)-octane and a complex of a boron halide with a tertiary amine. Surprisingly, the mixtures of this invention accelerate at low temperature the cure of epoxy resins with hardeners such as polycarboxylic acid anhydrides substantially less than pure 1,4-diazabicyclo(2,2,2)octane or benzyl dimethylamine, while their accelerating action at the temperatures normally used for the cure differs from that of the cited accelerators only to a degree that is entirely negligible for actual practice.

The invention thus relates in one of its aspects to a heat-curable epoxy resin composition comprising (a) at least one epoxy resin, (b) at least one polycarboxylic acid anhydride, and (c) 1,4-diazabicyclo(2,2,2)octane or a $C_1$–$C_4$alkyl-substituted derivative of 1,4-diazabicyclo(2,2,2)octane as curing accelerator, and wherein one part of the curing accelerator (c) is replaced by (d) a complex of a boron halide with an amine.

The heat-curable epoxy resin systems of this invention may contain epoxy resins of any kind. These resins desirably contain more than one 1,2-epoxy group per molecule, said groups preferably being terminal epoxy or 2-methyloxiranyl groups and, more particularly, 2,3-epoxypropyl groups, which are attached direct to an oxygen, a nitrogen or a sulfur atom.

The epoxy resins thus typically embrace polyglycidyl and poly(β-methylglycidyl) esters which are obtainable by reacting a compound containing two or more carboxyl groups with epichlorohydrin or β-methylepichlorohydrin in the presence of alkali. Illustrative examples of compounds containing two or more carboxyl groups are aliphatic carboxylic acids such as oxalic acid, succinic acid, adipic acid, sebacic acid, dimerised or trimerised linoleic acid; cycloaliphatic carboxylic acids such as hexahydrophthalic acid, 4-methylhexahydrophthalic acid, tetrahydrophthalic acid, 4-methyltetrahydrophthalic acid; or aromatic carboxylic acids such as phthalic acid, isophthalic acid, terephthalic acid, trimellitic acid or trimesic acid, and the like.

Other suitable epoxy resins are the polyglycidyl and poly(β-methylglycidyl) ethers obtainable by reacting a compound containing two or more alcoholic or phenolic hydroxyl groups with epichlorohydrin or β-methylepichlorohydrin in the presence of alkali or in the presence of an acid catalyst and subsequent treatment with alkali. Such polyglycidyl ethers may be derived from aliphatic polyhydroxyl compounds such as ethylene glycol, poly(oxyethylene) polyols such as diethylene glycol or triethylene glycol, propylene glycol or poly(oxypropylene) polyols, propane-1,3-diol, butane-1,4-diol, pentane-1,5-diol, hexane-1,6-diol, hexane-2,4,6-triol, 1,1,1-trimethylolpropane or pentaerythritol. Other suitable alcohols are cycloaliphatic alcohols such as 1,1-bis(hydroxymethyl)cyclohex-3-ene, bis(4-hydroxycyclohexyl)methane, 2,2-bis(4-hydroxycyclohexyl)propane, and alcohols containing aromatic rings in the molecule, typically N,N-bis(2-hydroxyethyl)aniline or 4,4'-bis(2-hydroxyethylamino)diphenylmethane. Preferred alcohols containing aromatic rings are polyglycidyl ethers derivable from compounds containing two or more phenolic hydroxyl groups, as from resorcinol, brenzcatechol, hydroquinone, phloroglucinol or from polynuclear phenols, conveniently from bis(4-hydroxyphenyl)methane and 2,2-bis(4-hydroxyphenyl)propane, 2,2-bis(3,5-di-bromo-4-hydroxyphenyl)propane, 1,1,2,2-tetrakis(4-hydroxyphenyl)ethane, 4,4'-dihydroxydiphenyl, bis(4-hydroxyphenyl)sulfone, or from novolaks based on aldehydes such as formaldehyde, acetaldehyde, chloral, furfural, and phenol or phenol derivatives which are substituted by one or more chlorine atoms or $C_1$–$C_9$alkyl groups, e.g. 4-chlorophenol, cresol or 4-tert-butylphenol, preferably from phenol-formaldehyde and cresol-formaldehyde novolaks.

It is also possible to use other poly(N-glycidyl) compounds that are obtainable by dehydrohalogenation of reaction products of epichlorohydrin and amines containing at least two active hydrogen atoms bound to amino nitrogen, e.g. from aniline, N-butylamine, bis(4-aminophenyl)methane, bis(4-aminophenyl)sulfone or bis(4-methylaminophenyl)methane. Another N-glycidyl compound which is a suitable epoxy resin for the novel compositions of this invention is triglycidyl isocyanate.

The epoxy resins may also be mixed resins that contain one or more than one gylcidyl ether group and one or more than one glycidyl ester group in a molecule, for example the gylcidyl ether-glycidyl ester of salicylic acid.

Epoxy resins that contain non-terminal epoxy groups may also be used, for example vinylcyclohexene dioxide, dicyclopentadiene dioxide, 3,4-epoxydihydrocyclopentadienyl glycidyl ether, limonene dioxide, 3,4-epoxycyclohexylmethyl-3',4'-epoxycyclohexylcarboxylate and the 6,6'-dimethyl derivative thereof, the bis(3,4-epoxycyclohexanecarboxylate) of ethylene glycol or 3-(3,4-epoxycyclohexyl- 8,9 -epoxy- 2,4-dioxy spiro [5,5]undecane, epoxidised butadiene polymers or epoxidised copolymers of butadiene with other ethylenically unsaturated compounds such as styrene or vinyl acetate.

It will be readily understood that the compositions of this invention may also contain mixtures of two or more than two epoxy resins of the kind retorted to above. Sometimes it can be of advantage to use such mixture comprising a liquid and a solid epoxy resin, for instance a mixture of different oligomers.

Particularly preferred epoxy resins are 3,4-epoxycyclohexylmethyl-3',4'-epoxycyclohexanecarboxylate and polyglycidyl ethers of novolaks from formaldehyde and phenol itself or a phenol derivative which is substituted in the ring by a chlorine atom or a $C_1$–$C_4$alkyl group, and, in particular, polyglycidyl ethers of bis(4-hydroxyphenyl)methane (bisphenol F) and/or 2,2'-bis(4-hydroxyphenyl)propane (bisphenol A), or mixed glycidyl ethers of bisphenol A and bisphenol F.

One or more than one polycarboxylic acid anhydride is used as the hardener component (b) of the novel epoxy resin compositions. These anhydrides are most preferably compounds which are liquid or solid at room temperature and have in particular a melting or sublimation point of up to 150° C. Illustrative examples of suitable anhydrides are phthalic anhydride, hexahydrophthalic anhydride, methyl-1, 2,3,6-tetrahydrophthalic anhydride, hexachloroendomethylene-1,2,3,6-tetrahydrophthalic anhydride or methylendomethylenetetrahydrophthalic anhydride, maleic anhydride, succinic anhydride or alkenylsuccinic anhydride, e.g. nonenylsuccinic or dodecenylsuccinic anhydride, polysebacic anhydride, polyacelaic anhydride, pyrromellitic dianhydride, benzophenone-3,3',4,4'-tetracarboxylic acid anhydride. It is of course also possible to use mixtures of one or more than one anhydride. Usually about 0.4 to 11 equivalents of polycarboxylic acid anhydride are used per epoxy equivalent in the novel compositions. Larger amounts of hardener, however, can also be used, e.g. corresponding to a ratio of 1.5 to 1.6 equivalents of anhydride per epoxy equivalent.

The anhydrides of aromatic polycarboxylic acids tire preferred, in particular phthalic anhydride, or of cycloaliphatic polycarboxylic acids, e.g. hexahydrophthalic anhydride and tetrahydrophthalic anhydride, or derivatives of these compounds substituted by $C_1$–$C_4$alkyl groups.

Compound (c) of the novel epoxy resin systems and compositions is either 1,4-diazabicyclo(2,2,2)octane itself or a derivative thereof which is substituted by one or more than one $C_1$–$C_4$alkyl group. Those skilled in the an are familiar with such compounds some of which are commercially available or can be obtained by known methods, inter alia according to WO-A-87/03 592. 592. 1,4-Diazabicyclo(2,2,2)octane itself is preferred.

Component (d) of the novel epoxy resin compositions is preferably a complex of boron trifluoride or boron trichloride with an amine. Suitable amines are primary and secondary amines as well as, preferably, tertiary amines. The term "amine" in this context shall also be understood as comprising N-heterocycles.

Preferred complexes have the formula $B(Hal)_3X$, wherein X is an amine of formula $H_2NR^1$ or $NR^1R^2R^3$ and Hal is a fluorine or chlorine atom, and $R^1$, $R^2$, $R^3$ are each independently of one another an alkyl radical of 1 to 18 carbon atoms, a cycloalkyl radical of 3 to 18 carbon atoms, an aralkyl radical of 6 to 18 carbon atoms, an aromatic radical of 6 to 18 carbon atoms, or $R^1$ and $R^2$, together with the nitrogen atom in the above formula, are a five- or six-membered heterocycle to which a further benzene ring may be fused, and $R^3$ has one of the meanings given above, or $R^1$, $R^2$ and $R^3$, together with the nitrogen atom in the above formula, are a five- or six-membered heterocycle to which a further benzene ring may be fused.

Illustrative examples of suitable amines are ethylamine, trimethylamine, tri-n-propylamine, N,N-dimethyloctylamine, triphenylamine, N,N'-dimethylaniline, N-benzyldimethylamine, pyridine, the different picolines, collidine (2,4,6-trimethylpyridine), quinoline or isoquinoline, piperidine, N-methylpiperidine, N-methylmorpholine, 1,4-diazabicyclo(2,2,2)octane, hexa(N-methyl)melamine, N-cyclohexyldimethylamine or phenylenediamines such as 1,4-phenylendiamine. Such boron halide complexes are known and can be prepared by, or in general accordance with, the methods described in U.S. Pat. Nos. 2,890,195 and 3,793, 247.

Particularly preferred complexes are complexes of boron trifluoride and, preferably, of boron trichloride, with aliphatic amines in which the aliphatic moieties may each independently of one another contain 1 to 8 carbon atoms. Complexes of $BCl_3$ with N,N-dimethyloctylamine and of $BF_3$ with monoethylan-fine are most preferred.

The epoxy resin compositions contain the curing accelerator, i.e. components (c) and (d) together, in the total amount commonly employed for using tertiary amines as accelerators for anhydride curing, i.e. generally in an amount of 0.05 to 15% by weight, preferably of 0.3 to 5% by weight, based on the total amount of epoxy resin and polycarboxylic acid anhydride. It is most preferred to use a total amount of accelerator of less than 2.5% by weight, typically of 0.5 to 1.5% by weight, based on the total amount of epoxy resin and polycarboxylic acid anhydride.

The skilled person can vary at will the ratio of the two accelerator components (c) and (d) to each other in acordance with pot-life and storage stability over a relatively wide range. If necessary by means of simple measurements, for example of the gel time or the viscosity increase of the accelerated epoxy resin compositions, he can quickly determine the ratio of components (c) and (d) that meets his requirements. Particularly good results can be achieved if the weight ratio of the DABCO component (c) to the boron halide complex component (d) ranges from 8/92, preferably from 20/80, to 75/25, most preferably from 40/60 to 75/25. A very balanced reactivity/stability ratio and at the same time a very good $T_g$ value for the cured material may be achieved with mixtures of approximately equal parts by weight of components (c) and (d).

The novel compositions may additionally contain the further components commonly employed in the art of heat-curable epoxy resin compositions, typically including plasticisers such as dibutyl phthalate, dioctyl phthalate, or tricresyl phosphate, suitable inert solvents, reactive diluents, in particular monofunctional epoxides, for example butyl glycidyl ether, isooctyl glycidyl ether, phenyl glycidyl ether or glycidyl esters of monofunctional carboxylic acids, in particular (branched) aliphatic carboxylic acids. Other customary additives include pigments, dyes, flame retardants, wetting agents, antifoams, antioxidants and light stabilisers. In some cases it may also be useful to add polyalkylene polyols such as polyethylene glycol or polypropylene glycol, preferably in an amount of 1 to 30% by weight, based on epoxy resin, for example to enhance the mechanical properties such as flexibility, of the cured material.

A further group of additives comprises extenders, reinforcing agents and fillers. Illustrative examples of such additives are asphalt, bitumen, kaolin (china clay), quartz powder, cristobalite, glass powder, glass spheres, chalk, mica, wollastonite, alumina, magnesium oxide, fibre material, also in powdered form such as glass fibres, carbon fibres, metal fibres, polyvinyl chloride, nylon, polyethylene, polyester, cured epoxy material, or flame-proofing fillers, in particular aluminium trihydrate. The fillers may in some cases be surface-treated, e.g. with silane or organotitanium adhesion promoters. It is of course also possible to use mixtures of fillers. The fillers preferably have a particle size in the range from 10 to 3000 μm, more particularly from 50 to 1000 μm. The content of such fillers in the novel mixtures may typically be from 20 to 70% by weight, preferably from 50 to 65% by weight. Especially when using fillers it can be useful to add an antisettling agent to the novel epoxy resin compositions, conveniently a thixotropic agent such as silia, bentonite or hydrogenated castor oil. As the antisettling action of the thixotropic agent at the elevated temperatures that may occur in the cure of the compositions, in particular shortly before gelation, may sometimes be not quite sufficient owing to an initial decrease in viscosity, it may also be useful to add to the novel compositions polymers that are soluble in the hot composition, for example polyvinyl formals, polyvinyl butyrals, polyoxyethylene, polycaprolactones or polyamides, usually in amounts of 0.5 to 20% by weight, preferably 1 to 3% by weight, based on the epoxy resin.

The epoxy resin compositions of this invention can be formulated in known manner as multicomponent systems, i.e. in the form of a number of single components each of which comprises only a portion of components (a), (b), (c) and (d). In the case of two component systems the accelerator composition can be blended in equal or in different proportions either with the epoxy resin component or, preferably, the hardener component, but also with both components. It will be readily appreciated that it is equally possible to add one constituent of the novel curing accelerator to one of the two components, or to add one constituent to one of the components, for example the hardener component, while using the other constituent of the accelerator unblended. Another multicomponent system of this invention might consist of 1,4-diazabicyclo(2,2,2)octane or a $C_1$–$C_4$alkyl-substituted derivative of 1,4-diazabicyclo(2,2,2)octane as a first component and a curable composition comprising an epoxy resin, a polycarboxylic acid anhydride and the relatively latent complex of the boron halide with the amine as a further component. A particularly useful system of this invention is one comprising more than two components, namely an epoxy resin component, a hardener component and a curing accelerator system consisting of the above constituents (c) and (d) as third component, in particular a composition comprising 1,4-diazabicyclo(2,2,2)octane or a $C_1$ –$C_4$alkyl-substituted derivative of 1,4-diazabicyclo-(2,2,2)octane, a complex of a boron halide with an amine and optionally a polycarboxylic acid anhydride and/or a solvent, e.g. polyethylene glycol or dibutyl phthalate.

The novel epoxy resin systems or single components for the preparation of said systems can be obtained by mixing their constituents using conventional means such as stirrers, kneaders, rolls or mills, with or without heating said constituents or components. As it is usually desired to mix the epoxy resin with the hardener below the curing temperature, it can be useful to premix other constituents of the novel system, conveniently the curing accelerator (c) and (d), but also fillers or other additives, initally with the epoxy resin or the hardener, as in this case higher temperaturees can usually be applied.

The cure of the final mixture is normally effected in the temperature range from 80° to 200° C., preferably from 90° to 160° C.

The heat-curable systems of this invention can be used as casting resins for all utilities for which heat-curable epoxy resin systems are employed, typically for making prepregs or laminates, for surface coatings, for casting electrical and electronic components, as adhesives or for fabricating moulded objects. The invention therefore also relates to the use of the described curable systems as casting compositions, preferably as electrical casting compositions.

The moulded objects can be fabricated by conventional methods, for example by hand. A further possibility is the use of the automatic pressure gelation method that is disclosed, inter alia, in EP-A-O 333 456.

A further object of the invention is accordingly a process for the production of moulded objects using the above described epoxy resin system, which comprises mixing a component of said system comprising the epoxy resin and a component of said system that comprises the hardener as well as the other optional constituents of the system at a temperature below the curing temperature, e.g. in the temperature range from 40° to 80° C., preferably from 40° to 60° C., and introducing said mixture under normal or elevated pressure, e.g. a pressure of 1.5 to 6 bar, preferably from 1.5 to 3 bar, into a mould in which the temperature is sufficiently high to effect cure of the resin moulding material, and preferably introducing uncured resin moulding material continuously in such an amount as to compensate for any shrinkage of the resin moulding material in the mould occurring in the course of the cure.

EXAMPLE 1

100 g of diglycidyl ether of bisphenol A (epoxy value 5.2 eq/kg) are homogeneously mixed with 79.8 g of a mixture of methyltetrahydrophthalic anhydride isomers (0.85 mol of anhydride/epoxide equivalent) and with each of the amounts of 1,4-diazabicyclo(2,2,2)octane (DABCO) indicated in Table 1 below and boron trichloride-octyl dimethylamine complex.

The mixtures are tested to determine the following values: the time for the viscosity to reach 1500 mPa.s at a temperature of 80° C. (viscosity build-up according to DIN 53015/ Hoeppler falling-ball viscosimeter; sample c. 10 ml), the Gelnorm gelation time (15 ml sample) according to DIN 16945, Sheet 1, using a Gelnorm® gel timer (supplied by GEL INSTRUMENT AD, CH), as well as the softening temperature $T_g$ according to IEC Standard 15a of the Int. Electrotechnical Commission using a Mettler TA 3000® (heating up rate 10° C/minute; weighed sample c. 30 milligrams). The values measured are also shown in Table 1.

TABLE 1

| Example No. | 1.1 | 1.2 | 1.3 | 1.4 | 1.5 |
| --- | --- | --- | --- | --- | --- |
| Amounts of DABCO in grams | 0.7 | 0.5 | 0.35 | 0.2 | 0.0 |
| $BCl_3/(CH_3)_2N(C_8H_{17})$-complex | 0.0 | 0.2 | 0.35 | 0.5 | 0.7 |
| Viscosity build-up [min] | 150 | 205 | 270 | —* | —* |
| Gel time ** at | | | | | |
| 80° C. | 3h46' | 5h20' | 6h33' | 9h08' | 27h06' |
| 100° C. | 52'50" | 1h06' | 1h24' | 1h36' | 2h48' |
| 140° C. | 3'43" | 5'42" | 5'38" | 6'34" | 8'22" |
| $T_g$[°C.] | 133 | 132 | 134 | 131 | 127 |

*not measured
**' = minutes; " = seconds

EXAMPLE 2

100 g of a mixed diglycidyl ether of bisphenol A and bisphenol F (epoxy value of the mixture 5.65 eq/kg) are homogeneously mixed with 80 g of a mixture of methyltetrahydrophthalic anhydride isomers (0.85 mol of anhydride/epoxide equivalent), 11 g of polyethylene glycol 400 (molecular weight 400), 0.2 g of 1,4-diazabicyclo(2,2,2)-octane and 0.5 g of boron trichloride-octyl dimethylamine complex and quartz powder W 12 to a composition that contains 65% by weight of quartz powder.

The epoxy resin system has the following properties:

| gel time at | |
| --- | --- |
| 80° C. | 7h30' |
| 100° C. | 1h50' |
| 140° C. | 7'37". |

The following properties are determined after a cure of 4 hours at 100° C. and 10 hours at 140° C.:

| $T_g$(determined as in Example 1) | 90° C.; |
| --- | --- |
| flexural strength[1] | 151 N/mm$^2$; |
| modulus of elasticity from flexural test[1] | 11060 N/mm$^2$; |
| impact strength 2 | 11 kJ/m$^2$. |

[1]according to ISO 178; specimen measuring 60 × 10 × 4 millimeters
[2]according to ISO 179/1D; specimen measuring 60 × 10 × 4 millimeters The gel time at 80° C. of this composition is accordingly more than twice, and hence the pot-life is also more than twice, that of a similar epoxy resin composition containing benzyl dimethylamine as curing accelerator, while the other data listed above are at least as good as those of a similar composition containing benzyl dimethylamine.

What is claimed is:

1. A heat-curable epoxy resin system comprising
   (a) at least one epoxy resin,
   (b) at least one polycarboxylic acid anhydride, and
   (c) 1,4-diazabicyclo(2,2,2)octane or a C1-C4alkyl-substituted derivative of a 1,4-diazobicyclo(2,2,2)octane as curing accelerator, and wherein a portion of the curing accelerator (c) is replaced by
   (d) a complex of $BCl_3$ with N,N-dimethyloctylamine, and wherein the weight ratio of component (c) to component (d) ranges from 8/92 to 75/25.

2. An epoxy resin system according to claim 1, comprising 1,4-diazabicyclo(2,2,2)octane as component (c).

3. An epoxy resin system according to claim 1, wherein the weight ratio of component (c) to component (d) ranges from 40/60 to 75/25.

4. An epoxy resin system according to claim 1, wherein the epoxy resin is selected from the group consisting of a glycidyl ether of bis(4-hydroxyphenyl)methane (bisphenol F), of 2,2'-bis(4-hydroxyphenyl)propane (bisphenol A), and a mixed glycidyl ether of bisphenol A and bisphenol F.

5. An epoxy resin system according to claim 1, which contains an anhydride of an aromatic or cycloaliphatic polycarboxylic acid.

* * * * *